United States Patent

[11] 3,600,838

| [72] | Inventor | Charles W. Bablick |
| | | 233 Sherry Ave., Park Falls, Wis. 54552 |
| [21] | Appl. No. | 872,039 |
| [22] | Filed | Oct. 29, 1969 |
| [45] | Patented | Aug. 24, 1971 |

[54] BAIT-HARNESSING FISH HOOKS
5 Claims, 3 Drawing Figs.

[52] U.S. Cl............................................... 43/44.8,
43/43.6, 43/44.6
[51] Int. Cl......................................... A01k 83/06
[50] Field of Search............................. 43/43.6,
44.2, 44.6, 44.8

[56] References Cited
UNITED STATES PATENTS

| 440,721 | 11/1890 | Provoost | 43/44.8 |
| 2,193,103 | 3/1940 | Kowalski | 43/44.8 |
| 2,534,469 | 12/1950 | Moore | 43/44.8 |
| 2,601,160 | 6/1952 | Mattieson | 43/44.8 |

Primary Examiner—Aldrich F. Medbery
Attorneys—Joseph G. Werner, Theodore J. Long, John M. Winter and James A. Kemmeter ABSTRACT: A bait-harnessing fish hook that retains the bait within the confines of a plurality of fish hook members so that a fish cannot strike at the bait without encountering one or more fish hooks. The device has a centrally positioned bait hook and a plurality of fish hook shanks depending from and surrounding the bait hook. A plurality of hooks are formed at the end of each fish hook shank as are also bait-penetrating spurs, the latter operating in conjunction with the bait hook to retain the bait. The fish hooks have weed deflector means to prevent entanglement with underwater objects.

PATENTED AUG 24 1971

3,600,838

INVENTOR.
CHARLES W. BABLICK
BY Joseph G. Werner
James A. Kemmeter
ATTORNEYS

BAIT-HARNESSING FISH HOOKS

BACKGROUND OF THE INVENTION

1. Field of the Invention

This invention relates to an improved fish hook, and more particularly to a fish hook that has harnessing means to retain bait in a position surrounded by hooks.

2. Description of the Prior Art

Devices of various designs to retain bait within a barrier of hooks have been invented in the past. One such device, shown in U.S. Pat. No. 2,534,469, comprises a plurality of circumferentially spaced fish hooks with one of the hooks having an additional barb on its shank that prevents bait slipping downwardly off the shank after the bait has been skewered onto the hook. A disadvantage of this kind of bait-restraining fish hook is that the insertion of the hook into minnow bait from near the head down along the back and out near the tail will kill the minnow quite rapidly. This will cause the bait to settle downward in a very limp fashion and to look unnatural as it is pulled through the water.

Another device, shown in U.S. Pat. No. 2,927,393, has a frame with a bait mouthpiece at its closed end and bait impaling prongs on each shank of the frame at its open end. The prongs impale the minnow at its sides and force the mouth of the minnow onto the mouthpiece. Again the disadvantage exists that, when the bait minnow dies and becomes limp, there is nothing to hold the minnow's mouth around the mouthpiece so that the minnow can settle backwards and/or slip sideways. When this happens, the prongs will lose much of their effectiveness in retaining the bait. Moreover, the frame does not have any fish hooks integral with it, but rather is adapted to have hooks connected to it. When the device is being pulled through the water to give the bait minnow a natural appearance the hooks will all be hanging below the bait rather than surrounding the bait.

SUMMARY OF THE INVENTION

Generally, my invention comprises a bait-harnessing fish hook for retaining the bait in a central position surrounded on at least four sides by fish hooks. The bait, such as minnows or frogs, are retained in such a manner that it will look natural when pulled through the water, even if the bait has died. Another object is to provide that the fish hooks surrounding the bait are in the same plane that the bait is being pulled in through the water so that the bait is always surrounded by the fish hooks.

These objects are accomplished by my device which has a centrally positioned bait hook and a plurality of semi-U-shaped shanks that enclose the central bait hook. The shanks, at the ends most distant from the bait hook, terminate in a plurality of barbed hooks that are substantially at right angles with each of the hooks circumferentially adjacent thereto. Thus, a fish striking at the bait from any side will encounter at least one hook before getting its mouth around the bait.

Other objects, features and advantages of my invention will be apparent from the following detailed description taken in conjunction with the accompanying drawings.

DESCRIPTION OF THE PREFERRED EMBODIMENT

Figure 1:
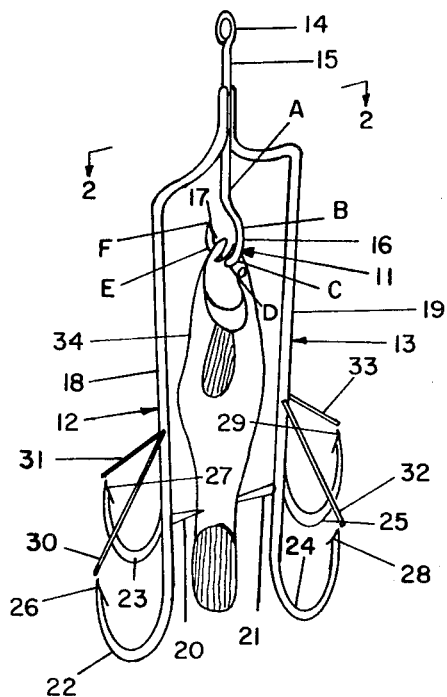
FIG. 1 is a perspective view showing the preferred embodiment of my invention with a minnow being retained according to the objects of my invention.

Referring now more particularly to the drawings wherein like numerals refer to like parts throughout the several views, my bait-harnessing fish hook is generally shown at 10 in FIG. 1. The hook comprises a bait hook 11 centrally positioned between the fish hooks 12 and 13.

Bait hook 11 is similar to an ordinary fish hook in that it has an eye 14, shank 15 and hook 16 with barbed point 17. However, unlike an ordinary fish hook, bait hook 11 has a special curve, as best shown in FIG. 1, first outwardly from shank 15 and downwardly, as between points A—B; then downwardly, as between points B—C; then downwardly and inwardly, as between points C—D; then outwardly, oppositely from the first outward curve A—B, and upwardly, as between points D—E; and then upwardly, as between points E—F, terminating in the barbed point. It is thus seen that the lowest point of the hook 16 is substantially at point D, and it is substantially in the plane of the imaginary extension of shank 15 and substantially equally distant from points B and F along a line perpendicular to said imaginary extension of shank 15. When bait, such as a minnow, generally depicted by 34 is placed on the bait hook 11, it will hang substantially from the point depicted as D and thus be centered between fish hooks 12 and 13.

Shank members 18 and 19 of fish hooks 12 and 13, respectively, are each offset outwardly in a common plane from the shank 15 and together are substantially semi-U-shaped, so that, when they are attached dependingly at one of their ends to shank 15 of bait hook 11, they form a substantially U-shaped harness around the bait. It is noted that said shank members 18 and 19 are substantially longer than shank 15 and they first diverge from each other at their attached ends and then converge back toward each other at their distal ends. The reason for the wider width between the shank members at their attached ends is to make it easier to hook the bait with bait hook 11. By having the shank members then converge back toward each other, the hooks at the end of the shank members will be in closer proximity to the bait, and consequently, it will be more difficult for a fish to strike at the bait without encountering one of the hooks.

Figure 3:
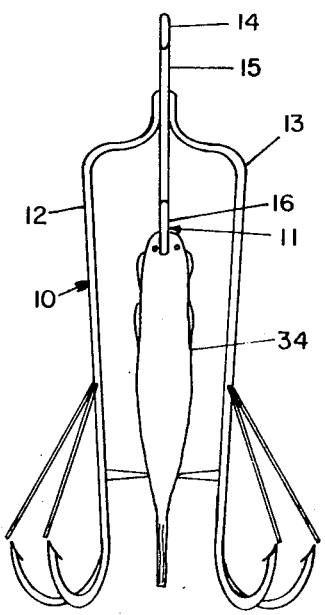
FIG. 3 is a front elevation of the bait-harnessing fish hook of FIG. 1.

At the convergent ends of shank members 18 and 19, there are formed bait penetrating spurs 20 and 21, respectively. These spurs are pointed inwardly substantially toward each other and penetrate the bait 18 at the other end of the bait from where it is hooked to bait hook 11 as seen in FIG. 3. It is thus seen that the bait will be securely retained within the confines of the bait-harnessing arrangement and cannot fall loose or become limp if the bait should die. When the hook 10 is pulled through the water, the bait will remain in alignment with the hook and its movement will therefore look natural even if the bait is dead.

Fish hooks 12 and 13 are preferably made of a resilient material such as spring steel to facilitate loading the bait harness and retaining the bait therein. When loading the bait, a user can spread apart the shank members 18 and 19 and hook the bait, such as a minnow or frog, through the lips with bait hook 11. Shank members 18 and 19 are then released and the tension created by spreading said shank members apart will cause said shank members to spring back and bait spurs 20 and 21 will penetrate into the bait to help retain said bait within the harness.

Figure 2:
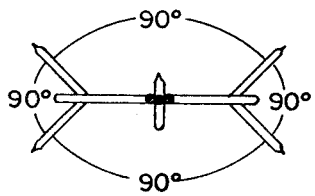
FIG. 2 is a section view taken on the line 2—2 of FIG. 1, except that the minnow bait is omitted.

At the convergent ends of shank members 18 and 19 are hooks 22, 23, 24 and 25 with barbed points 26, 27, 28 and 29. Hooks 22 and 23 on shank member 12 are at right angles to each other, as are hooks 24 and 25 on shank member 13. In addition, each hook is also at right angles to one of the hooks on the other shank member, and the hooks on one shank member point in opposite directions than the hooks on the other shank member. As shown by FIG. 2, this arrangement establishes a hook pointing in four opposite directions so that no matter what direction a fish might strike at the bait 18 from, it will have to encounter one of the hooks 22-25. Because of the substantially close overall configuration of my bait-harnessing fish hook, a fish could not get its mouth around the bait alone without encountering at least one of the fish hooks or the bait hook.

Weed deflectors 30, 31, 32 and 33 protect each of the hooks 22-25 respectively and prevent them from becoming hooked or entangled in weeds and other obstacles in the water.

Of course, it is recognized that fewer or additional shank members, spurs or hooks on each shank member might be used, without departing from the spirit and scope of my invention.

I claim:
1. A bait-harnessing fish hook comprising:
   a. a centrally positioned bait hook having an eye, shank and hooked portion
   b. a pair of fish hooks each having shank members rigidly attached to said centrally positioned shank adjacent its eye, and a pair of spaced divergent barbed hook members extending outwardly from each distal end of said shank member,
   c. said shank members having offset portions at their attached positions, each of the shank members being located in a common plane, the outer longer shank members being substantially equally spaced from said central hook shank,
   d. bait-penetrating spurs at the distal ends of said shank members, said spurs extending inwardly substantially toward each other, and
   e. means for deflecting weeds from barbed hook members.
2. The bait-harnessing fish hook of claim 1 wherein the fish hooks are formed from a resilient material.
3. The bait-harnessing fish hook of claim 1 each of said pair of hook members on each said shank member being outwardly extending and substantially at right angles with the other hook member on the same shank member and with one of the hook members on said other shank.
4. The bait-harnessing fish hook of claim 3 wherein the semi-U-shaped shank members of said pair of fish hooks depend from the shank of said bait hook so as to form a general U-shape in substantially a single plane, said bait penetrating spurs extending substantially within said plane.
5. The bait-harnessing fish hook of claim 4 wherein the hook of said centrally positioned bait hooks curves first outwardly and downwardly from the shank then downwardly and inwardly back towards and through an imaginary extension of said shank, and then upwardly and outwardly from said shank ending in a point, said point being on the opposite side of said imaginary extension of said shank from the first outwardly and downwardly curve of said hook.